Figure 1:
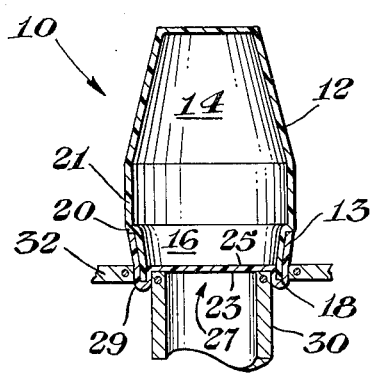

March 8, 1966  W. I. HOYLE  3,239,397
CONTAINER FABRICATION
Filed Feb. 12, 1962

INVENTOR.
Wallis Irvine Hoyle
BY
AGENT

United States Patent Office 3,239,397
Patented Mar. 8, 1966

3,239,397
CONTAINER FABRICATION
Wallis I. Hoyle, Sarnia, Ontario, Canada, assignor to The Dow Chemical Company, Midland, Mich., a corporation of Delaware
Filed Feb. 12, 1962, Ser. No. 172,459
3 Claims. (Cl. 156—69)

This invention relates to the fabrication of containers, and more particularly relates to the fabrication of containers from thermoplastic resinous materials wherein there is apparently no external lap seal or joint.

Thermoplastic resinous containers are widely utilized for the packaging of a wide variety of merchandise. Particularly beneficial and advantageous among such containers are the rigid plastic containers such as bottles, cylindrical can-type and similar packages. Generally, such containers are made by blow molding in order that a uniform, smooth surface without an unsightly lap joint is obtained. Blow molding and similar forming techniques, which are particularly useful for bottles, often are undesirable for many applications as the cost of the fabricated container is usually excessive relative to the packaged product.

Low cost plastic containers are fabricated from extruded or vacuum-formed parts which are heat or adhesive sealed together to form the final article. Frequently, adhesive sealing is undesirable as it is necessary to seal the container after filling and oftentimes, the contents will tend to contaminate the area to be sealed and result in a leak or other fault, giving rise to a less than desirable product.

In certain cases, the container may be heat sealed together, but this technique almost invariably, according to the known art, results in a flange flash or similar unsightly and frequently mechanically undesirable disfigurement of the container. The use of solvent sealing to overcome this disadvantage usually introduces an extra operation into the packaging procedure with the requirement of an adhesive application station and, frequently, the solvent utilized in the formulation of the adhesive gives rise to crazing, cracking, or distortion of the final product and sometimes in contamination of the product being packaged.

It is an object of this invention to provide an improved method of heat sealing thermoplastic resinous containers.

It is a further object of this invention to provide a method of heat sealing a thermoplastic container which permits the finished article to have a smooth external configuration, unbroken by raw edges of the container portions.

It is another object of this invention to provide a method of sealing a thermoplastic container by heat sealing wherein two or more container portions are joined together with a joint having controlled and regular geometry.

These benefits and other advantages are achieved in accordance with the invention by preparing a sealed container, said container comprising at least a first portion and a second portion, said first portion and said second portion adapted to interfit in such a manner that the externally visible joint betwen container portions results in a generally continuous outline, said first container portion defining a recess which is internal to said container, said second container portion defining a recess within said container adapted to closely interfit with said first portion and at least partially enclose an external recess of said first portion when said portions are in assembled relationship; the improvement which comprises inserting into said first portion recess a mandrel in closely fitting relationship with said recess, applying a form to the external portion of said first portion adjacent said mandrel, applying to said container portions while supported by means of said mandrel and form sufficient heat to cause said first portion and said second portion to be sealed together into a unitary container.

Figure 2:
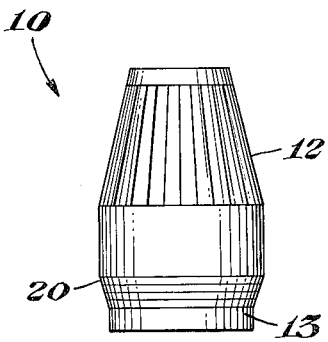
Figure 3:
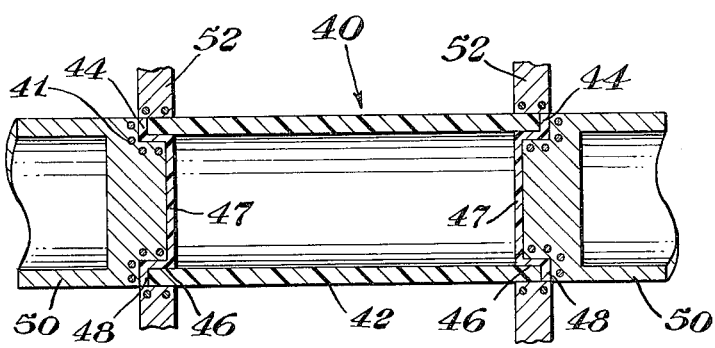

These features and other advantages of the present invention will become more apparent when taken in conjunction with the following specification and drawing wherein:

FIGURE 1 schematically depicts a view of a container being sealed in accordance with the invention;

FIGURE 2 depicts a view of a container sealed in accordance with the invention; and in FIGURE 3, there is illustrated schematically an alternate form of container being sealed in accordance with the invention.

In FIGURE 1, there is illustrated a closed container, in accordance with the invention, generally designated by the reference numeral 10. The container 10 comprising a first portion, or body, 12 and a second portion, or cover, 13. The body 12 defines a cavity 14 having an opening 16 and terminal edge portions 18. Generally adjacent the edge portions 18 is a shoulder or rib 20 disposed on the external surface 21 of the body 12. The cover 13 has an external surface 23 and internal surface 25. The external surface of the cover 13 defines an external recess 27 and the surface 25 defines an internal recess 29 encircling the external recess 27. Disposed within the external recess 27 of the cover 13 is a heated mandrel 30. Generally adjacent and disposed radially about the portion of the cover 13 defining the internal recess 29 is an external heated support 32.

In operation of the method of the invention, the cover 13 is positioned on the mandrel 30 in such a manner that the mandrel engages the cavity or recess 27. The body 12 is positioned so that the lip 18 engages the recess 29 and the edge of the cover 13 abuts the shoulder portion 20 of the body 12. Alternatively, the container may be assembled prior to positioning on the mandrel 30. The form or retaining means 32 is brought into engagement with the cover portion 13. The mandrel 30 and the form 32 are then raised to a temperature sufficient to cause the plastic material of which the body 12 and the cover 13 are composed to soften and securely bond together in the area of the recess 29. After sufficient heat has been applied to the container 10 being sealed, the mandrel 30 and the form 32 are cooled until the plastic material becomes regid. The container is then removed from the mandrel and form. The mandrel and form may utilize any convenient means of heat supply such as electrical energy, hot fluids such as steam, oil, and the like.

In FIGURE 3, there is illustrated a sealing operation, in accordance with the invention, of a container generally designated by the reference numeral 40; the container 40 comprising a generally cylindrically shaped thermoplastic resinous body 42 in cooperative combination with a pair of mating end caps 44. The end caps 44 define an external cylindrical portion 46 and a generally cylindrical recess 47. The end caps 44 are positioned within the container 40 until the flanges 48 of the caps 44 engage the end of the cylindrical body 42. Disposed within the cylindrical recess 47 are a mating pair of mandrels 50. A pair of forms or clamps 52 having a generally cylindrical container engaging configuration are attached to restrain the body 42. The mandrel 50 and the clamps 52 are attached, heated, and, in turn, heat the adjacent portions of the plastic cap 44 and the plastic body 42. After the cap and body have attained a suitable temperature to cause bonding, the mandrels 50 and clamps 52 are then cooled until the plastic body is self-supporting. The mandrels and clamps are then removed.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative, and is not to be construed or interpreted as being restrictive or otherwise limiting of the present invention, excepting as it is set forth and defined in the hereto appended claims.

What is claimed is:

1. In a method for the preparation of a sealed closed container, said container comprising at least a first portion and a second portion, said first portion and said second portion adapted to interfit in such a manner that the externally visible joint between said container portions results in a generally continuous outline, said first container portion defining a recess which is internal to said container, said second container portion defining an internal recess within said container and said second container internal recess adapted to closely interfit with said first portion and at least partly enclose said first portion recess when said portions are in assembled relationship, said second portion defining an external recess encircled by the second portion internal recess the improvement which comprises inserting into said second portion external recess a mandrel in closely fitting relationship with said recess, applying a container engaging form to the external portion of said first portion adjacent said mandrel, applying to said container portions while supported by means of said mandrel and form, sufficient heat by means of said mandrel and form to cause said first portion and said second portion to be sealed together into a unitary container.

2. A method of fabricating a sealed container comprising providing a container consisting essentially of a first interfitting portion and a second interfitting portion, said first portion and said second portion also constructed and arranged as to provide a container without a visible external lap between said first portion and said second portion, said first portion defining a recess external to said container and a second portion having a recess interior to said container adapted to receive a part of said portion and at least partly enclose said internal recess of said first portion, assembling said first and second portion into interfitting relationship to form a closed container inserting a mandrel into said external recess of said second portion, applying a container engaging form about the external portion of said first portion adjacent to said external recess, heating said mandrel and form supported portions of said container until the temperature of the adjacent parts of the container portions is sufficiently high to seal said first portion to said second portion.

3. The method of claim 1, including the step of cooling said container until the sealed portion is self-supporting and removing said mandrel and form.

References Cited by the Examiner

UNITED STATES PATENTS

| | | | |
|---|---|---|---|
| 2,930,634 | 3/1960 | Merritt | 156—293 |
| 2,989,785 | 6/1961 | Stahl | 156—69 |
| 3,035,958 | 5/1962 | Wilkins | 156—311 |
| 3,074,837 | 1/1963 | Flax | 156—69 |
| 3,160,999 | 12/1964 | Lee | 53—39 |

JACOB H. STEINBERG, *Primary Examiner.*

HAROLD ANSHER, ALEXANDER WYMAN,
*Examiners.*